United States Patent [19]
Peters

[11] Patent Number: 6,053,222
[45] Date of Patent: Apr. 25, 2000

[54] DUNNAGE BAG DEFLATION TOOL

[76] Inventor: Gerald Lamar Peters, 1601 Sandbar Ferry Rd., Beech Island, S.C. 29841

[21] Appl. No.: 09/192,932

[22] Filed: Nov. 16, 1998

Related U.S. Application Data

[63] Continuation-in-part of application No. 08/865,108, May 29, 1997, Pat. No. 5,839,488.
[51] Int. Cl.[7] .................................................... F16K 15/20
[52] U.S. Cl. ......................... 141/347; 141/313; 141/348; 141/382; 137/224; 137/231; 137/625.25; 137/625.68; 410/119
[58] Field of Search .............................. 141/10, 313, 317, 141/346–350, 382, 383, 386; 137/223, 224, 225, 231, 625.2, 625.25, 625.67, 625.68; 410/119, 125

[56] References Cited

U.S. PATENT DOCUMENTS

| | | | |
|---|---|---|---|
| 3,693,916 | 9/1972 | Tritt et al. | 244/134 A |
| 4,045,835 | 9/1977 | Flam et al. | 405/186 |
| 5,524,481 | 6/1996 | Claussen et al. | 73/146.3 |

*Primary Examiner*—J. Casimer Jacyna
*Attorney, Agent, or Firm*—Laurence R. Brown

[57] ABSTRACT

This invention solves the problem of removing undamaged inflated dunnage bags from a cargo space by using a high pressure air source to both open the dunnage bag inflation valve and to suck air out of the bag by discharging the high pressure air through a venturi system. Thus large dunnage bags may be deflated in about one minute. The deflation valves provided by this invention also serve as inflation valves by simply disabling the venturi system.

6 Claims, 1 Drawing Sheet

DUNNAGE BAG DEFLATION TOOL

This application is a continuation-in-part of my application Ser. No. 08/865,108, filed May 29, 1997 for Hands-off Low-air-loss Quick-connect Quick-disconnect Fast-fill Dunnage Bag Filling Valve-Nozzle Assembly and System, now U.S. Pat. No. 5,839,488, Nov. 24, 1998.

TECHNICAL FIELD

This invention relates to the inflated dunnage bag field, and more particularly it relates to dunnage bag deflation tools and methods.

BACKGROUND ART

In U.S. Pat. No. 5,839,488, a quick-connect fast-inflate dunnage bag pneumatic valve provides for opening of a dunnage bag valve and filling of the dunnage bag quickly from a high pressure pneumatic source. The mechanism and construction of that novel valve is closely related to this invention, but that valve was limited in operation to the filling of the dunnage bags.

During unloading of cargo protected by filled dunnage bags, the bags take so long to deflate by their self-contained valves that the deflation time is not economically feasible. Thus, the bags, which are costly, are slit with a knife and destroyed to rapidly discharge the cargo.

This invention therefore has the primary objective of providing a tool that can rapidly deflate the dunnage bags and thus re-use them.

DISCLOSURE OF THE INVENTION

This invention thus converts the bag filling valves of the parent patent, to operate as pneumatic powered bag deflation tools, which suck a fully ballooned 36" by 48" bag into its original envelope shape in about one minute.

The conversion comes by replacing a closed back on the original filling valves with a venturi tube configuration which creates a vacuum at the opened dunnage bag valve to rapidly suck the air out.

This venturi tube also provides either a manual or mechanical switch for converting the novel valve assembly into a two-way inflation-deflation valve.

Other objects, features and advantages of the invention will be found throughout the following drawings, description and claims.

THE PREFERRED EMBODIMENTS

Figure 1:
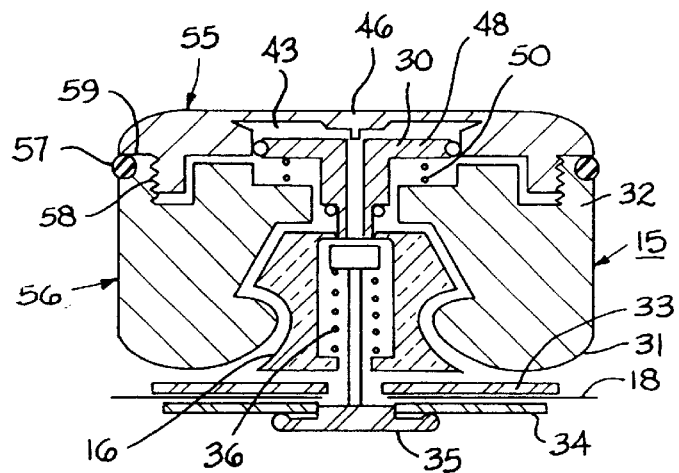
FIG. 1 is a cross section view of a bag filling valve of the parent application.

The cut-away, not to scale, sketch of FIG. 1 illustrates the general structure and operating mode of the dunnage bag filling valve 15 when in mating engagement with the protruding valve stem housing 16 of the dunnage bag 18. When a manually connected high pressure air source, typically 60 psi, is applied, the plunger 30 of the valve 15 moves (downwardly) to open the dunnage bag valve stem 35 and admits the air, which because of the valve structure is limited to a lower safe pressure flowing into the dunnage bag.

Figure 2:
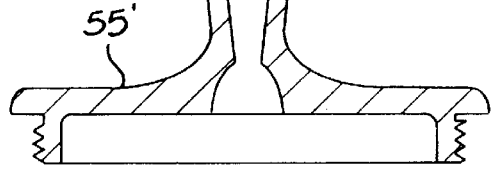
FIG. 2 is an exploded cross section view of modified valve parts afforded by this invention for converting the valve of FIG. 1 for deflating the dunnage bag by means of venturi tube suction.
Figure 2:
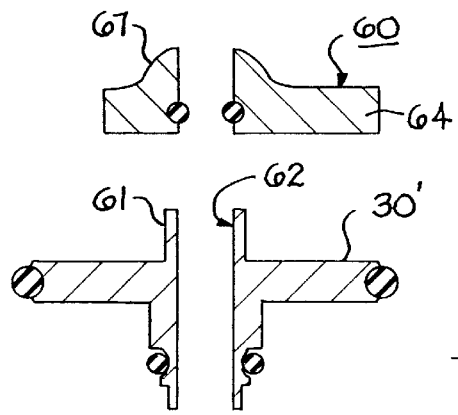

Now with reference to the exploded view of FIG. 2, it is seen that venturi tube 55' replaces the back closure plate 55 of the filling valve 15. Also the modified plunger 30' replaces plunger 30 of FIG. 1 so that the inner passageway 62 will provide an outward air flow path for deflation of a filled dunnage bag, extending axially through the intermediate air distribution valve member 60 and the venturi passageway 63.

Figure 3:
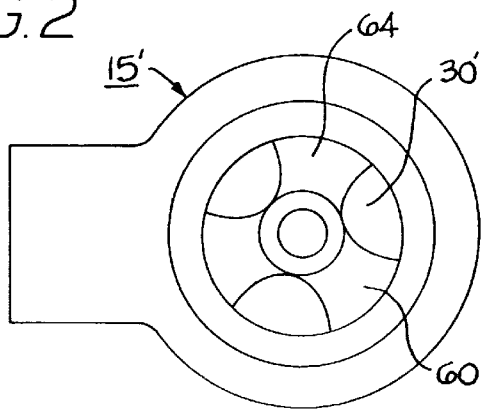
FIG. 3 is a top view of the partly assembled valve of FIG. 2 with the venturi tube removed.

The air distribution valve member 60, as better seen from FIG. 3, serves to let the input high pressure air open the dunnage bag valve during the presence of the high pressure air by contact with the upper surface of plunger 30' in the arcs between the distribution valve arms 64. Then the distribution valve 60 diverts the air flow upwardly over the arched surface 67 to enter the venturi cavity 63.

The venturi action of the sloped walls 63 reduces air pressure and creates a suction which withdraws air from the dunnage bag through the open dunnage bag valve stem until the bag is completely deflated, when the high pressure air is manually terminated by operation of an off-on valve in the high pressure source to thereby close the dunnage bag valve stem.

Figure 4:
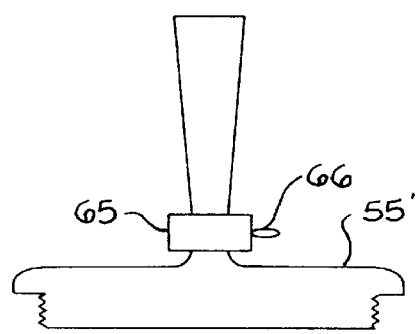
FIG. 4 is a sketch of a modified venturi tube of this invention having a bistable state valve to open and close the air flow path through it for transforming the valve operation from inflation utility to deflation utility.

By putting a thumb over the open mouth of the venturi tube, the modified valve reverts to its filling valve operation rather than the deflation valve operation. More conveniently, as seen in FIG. 4, the open-close valve 65 with a manually set bistable switching member 66 is installed in the venturi tube, so that the improved valve of this invention is conveniently used for either deflation or inflation of dunnage bags.

Having advanced the state of the art, those novel features indicating the spirit and nature of the invention are defined with particularity in the following claims.

I claim:

1. The pneumatic method of both inflating and deflating a self contained inflated object integrally carrying a built in normally closed air inlet valve, comprising the steps of:

pneumatically opening said air inlet valve of said object by application of an external source of pressurized air to the air inlet valve, selectively inflating the inflated object by introducing air flowing from said source of pressurized air, and removing resident air from the object with said air inlet valve pneumatically opened employing a discharge path for the pressurized air from said source through a venturi device passageway for passing air from said source of pressurized air to atmosphere thereby to suck air out of the inflated object when said air inlet valve is pneumatically opened.

2. The method of claim 1 further comprising the step of closing a normally open said venturi passageway to thereby pneumatically inflate said object from said source of pressurized air.

3. A pneumatic valve system for deflating a self contained inflated object integrally carrying a normally closed air inlet-outlet valve, comprising in combination;

access valve means responsive to the presence of an incoming source of high pressure air for opening said air inlet-outlet valve, and a discharge path in said access valve means including a venturi system for passing the high pressure air through the venturi system arranged to suck air from the inflated object when said air inlet-outlet valve is opened by said high pressure air.

4. The valve system of claim 3 further comprising manual switching means for opening and closing said discharge path, thereby to selectively operate said valve system in both inflation and deflation modes when said air inlet valve is opened by the high pressure air.

5. A simplified external valve assembly system for inflating and deflating a self contained dunnage bag having an integrated normally closed input-output air valve, comprising in combination, valve opening means for mating with said input-output air valve on a dunnage bag, an air flow passageway from a source of high pressure air through said external valve assembly for said input-output air valve in the dunnage bag for input of air into and discharge of air from said dunnage bag, an air flow passageway through the external valve assembly from said source of high pressure air to atmosphere including venturi means placed to suck air out of the dunnage bag when the input-output air valve in the dunnage bag is held open by high pressure air from said source of high pressure, and manually actuated air flow diverting means for opening and closing the air flow passageway to atmosphere to selectively deflate and inflate a dunnage bag with high pressure air from said source keeping said normally closed input-output air valve open.

6. The valve assembly system of claim 5 wherein the source air pressure is in the order of 60 psi and the valve opening means is provided with pressure reducing means for limiting air pressure in the dunnage bag to a lower safe pressure.

* * * * *